(12) United States Patent
Eskin et al.

(10) Patent No.: US 9,892,590 B2
(45) Date of Patent: *Feb. 13, 2018

(54) SYSTEMS AND METHODS FOR DATA PROTECTION

(71) Applicant: Ainsworth Game Technology Limited, Newington (AU)

(72) Inventors: Erdal Eskin, Sydney (AU); Baheerathan Gnanasundram, Sydney (AU); Waruna Manchanayake, Sydney (AU)

(73) Assignee: Ainsworth Game Technology Limited, Newington, NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,811

(22) Filed: May 4, 2015

(65) Prior Publication Data

US 2015/0235515 A1  Aug. 20, 2015

Related U.S. Application Data

(63) Continuation of application No. 13/812,661, filed as application No. PCT/AU2011/000929 on Jul. 25, 2011, now Pat. No. 9,027,146.

(30) Foreign Application Priority Data

Jul. 29, 2010 (AU) ................................ 2010903380
Oct. 11, 2010 (AU) ................................ 2010904533

(51) Int. Cl.
*G07F 17/34* (2006.01)
*G07F 17/32* (2006.01)

(52) U.S. Cl.
CPC ...... *G07F 17/3241* (2013.01); *G07F 17/3293* (2013.01); *G07F 17/34* (2013.01)

(58) Field of Classification Search
CPC ... G07F 17/34; G07F 17/3241; G07F 17/3293
(Continued)

(56) References Cited

U.S. PATENT DOCUMENTS 5,379,433 A * 1/1995 Yamagishi .............. G06F 21/10
340/5.31
5,694,471 A 12/1997 Chen et al.
(Continued)

OTHER PUBLICATIONS

International-Type Search Report, Australian Patent Office, Australian Patent Application No. 2010904533, dated Nov. 16, 2010.
(Continued)

*Primary Examiner* — Omkar Deodhar
*Assistant Examiner* — Shauna-Kay Hall
(74) *Attorney, Agent, or Firm* — Cook Alex Ltd.

(57) ABSTRACT

A data protection method includes identifying data indicative of a software element parameter of a software element to be protected, which may be a hash of the software element image or carrier media image area. The method includes identifying data indicative of a medium parameter of a medium authorized to carry the software element, which may be a unique identifier embedded in a non-image area of the medium. A validation token is defined based on a predefined protocol and written to a non-image area of the medium, which token is a function of the software element parameter and medium parameter. A device for executing the software element uses the same predefined protocol to verify the token prior to allowing execution of the software element. If the software element is copied to another medium, the validation token is not verifiable for the copied software, thereby restricting execution of the copied software element.

20 Claims, 5 Drawing Sheets

(58) Field of Classification Search
USPC .......................................................... 463/29
See application file for complete search history.

(56) References Cited

U.S. PATENT DOCUMENTS

| | | | |
|---|---|---|---|
| 5,844,986 A | 12/1998 | Davis | |
| 6,028,936 A | 2/2000 | Hillis | |
| 6,965,988 B1 | 11/2005 | Hansmann et al. | |
| 7,043,641 B1* | 5/2006 | Martinek | G06F 21/123 |
| | | | 380/251 |
| 7,260,219 B2 | 8/2007 | Linnartz et al. | |
| 7,549,922 B2 | 6/2009 | Falvey et al. | |
| 7,801,829 B2 | 9/2010 | Gray et al. | |
| 7,831,047 B2* | 11/2010 | Rowe | G06F 21/57 |
| | | | 380/251 |
| 7,996,916 B2* | 8/2011 | Cockerille | G07F 17/3241 |
| | | | 463/29 |
| 2002/0103964 A1* | 8/2002 | Igari | G06F 21/80 |
| | | | 711/112 |
| 2003/0195033 A1* | 10/2003 | Gazdic | A63F 13/00 |
| | | | 463/20 |
| 2006/0160626 A1* | 7/2006 | Gatto | A63F 13/12 |
| | | | 463/43 |
| 2007/0149280 A1* | 6/2007 | LeMay | G06F 21/57 |
| | | | 463/29 |
| 2008/0077803 A1 | 3/2008 | Leach et al. | |
| 2008/0153588 A1 | 6/2008 | Muir et al. | |
| 2008/0178284 A1* | 7/2008 | Harwell | G06F 21/10 |
| | | | 726/21 |
| 2009/0031143 A1* | 1/2009 | Hodzic | G06F 21/10 |
| | | | 713/193 |
| 2009/0191961 A1* | 7/2009 | McCoull | G06F 21/123 |
| | | | 463/29 |
| 2009/0276434 A1 | 11/2009 | Harris et al. | |
| 2010/0120526 A1 | 5/2010 | Singh | |
| 2010/0217992 A1* | 8/2010 | Hamlin | G06F 21/34 |
| | | | 713/176 |
| 2010/0311500 A1* | 12/2010 | Canterbury | G06F 21/121 |
| | | | 463/29 |

OTHER PUBLICATIONS

International Search Report for corresponding International Application No. PCT/AU2011/000929, dated Sep. 29, 2011.

* cited by examiner

SYSTEMS AND METHODS FOR DATA PROTECTION

BACKGROUND

The present invention relates to systems and methods for data protection, and in some embodiments to hardware and software utilized in the context of preventing unauthorized copying of software. Embodiments of the invention have been particularly developed for application in the context of environments where software image integrity is regulated, such as casino-type gaming environments. Whilst some embodiments will be described herein with particular reference to that application, it will be appreciated that the invention is not limited to such a field of use, and is applicable in broader contexts.

The following discussion of the prior art is intended to place the invention in an appropriate technical context and enable the associated advantages to be fully understood. However, any discussion of the prior art throughout the specification should not be considered as an admission that such art is widely known or forms part of the common general knowledge in the field.

Preventing unauthorized copying of software is a common concern for parties involved in the development and distribution of software products. A wide variety of techniques have been developed and applied, with varying levels of success. In broad terms, such techniques commonly rely on embedding identification data in each authorized copy of a software product, thereby to assist identification of unauthorized copies. For example, in some cases a unique key is required to activate a software product.

In the context of casino-type gaming software, such as software executable on slot machines or poker machines, there are often strict regulations governing software image integrity. In particular, when a particular software element (such as a game) is approved, that approval only covers exact replicas of the approved software element. That is, the image data on every carrier medium for that software element should be precisely identical. This limits the ability to leverage common software protection methods, as it is not permissible to embed unique identification data into each authorized copy, as this would vary the software image between copies.

It is an object of the present invention to overcome or ameliorate at least one of the disadvantages of the prior art, or to provide a useful alternative.

SUMMARY

One embodiment provides a computer implemented method for applying copy protection to a software element maintained on a carrier medium, the method including:
 (i) reading data maintained on an image area of the carrier medium, wherein the image area carries the software element;
 (ii) reading data from a non-image data area of the carrier medium, the data including a unique identifier for the carrier medium;
 (iii) applying a predetermined algorithm to data read at (i) and (ii) thereby to define a validation token for the software element as carried by the carrier medium; and
 (iv) writing the validation token to a non-image data area of the carrier medium.

One embodiment provides a method wherein the validation token is a function of a parameter of the image data maintained on the image area.

One embodiment provides a method wherein the validation token is a function of a parameter of an identifier maintained on the non-image area.

One embodiment provides a method wherein the validation token is a function of a parameter of the image data maintained on the image area and a parameter of an identifier maintained on the non-image area.

One embodiment provides a method wherein the validation token is a function of a parameter of the image data maintained on the image area and a parameter of an identifier unique to the carrier medium.

One embodiment provides a method wherein the data read at (i) includes a hash of the data maintained on the image area.

One embodiment provides a method wherein the data read at (i) includes a hash of the data defining the software element.

One embodiment provides a method wherein the software element is for execution via a casino-type electronic gaming machine.

One embodiment provides a method the software element includes a casino-type game for execution via an electronic gaming machine.

One embodiment provides a method wherein the non-image area of the carrier medium includes firmware for allowing operation of the carrier medium.

One embodiment provides a portable non-transitive computer readable carrier medium including:
 an image area that carries a software element defined by computer executable code; and
 a non-image area that carries an identifier unique to the carrier medium;
 wherein the non-image area additionally carries a validation token defined as a function of a parameter of the image area and the identifier unique to the carrier medium.

One embodiment provides a portable non-transitive computer readable carrier medium including:
 an image area for carrying a software element defined by computer executable code; and
 a non-image area that carries an identifier unique to the carrier medium;
 wherein the non-image is configured to carry a validation token defined as a function of a parameter of the image area and the identifier unique to the carrier medium.

In one embodiment the validation token is defined as a function of a parameter of the software element and the identifier unique to the carrier medium.

One embodiment provides a medium wherein the validation token is defined as a function of a hash of the software element and the identifier unique to the carrier medium.

One embodiment provides a medium wherein the software element is for execution via a casino-type electronic gaming machine.

One embodiment provides a medium wherein the software element includes a casino-type game for execution via an electronic gaming machine.

One embodiment provides a medium wherein the non-image area of the carrier medium includes firmware for allowing operation of the carrier medium.

One embodiment provides a method for operating a gaming machine, the method including:
 (i) receiving data indicative of the introduction of a carrier medium;
 (ii) reading data maintained on an image area of the carrier medium, wherein the image area carries a software element;

(iii) reading data from a non-image data area of the carrier medium, the data including a unique identifier for the carrier medium;

(iv) applying a predetermined algorithm to data read at (ii) and (iii) thereby to define a validation token for the software element as carried by the carrier medium;

(v) comparing the validation defined at (iv) token to an existing validation token carried on a non-image data area of the carrier medium to determine whether predefined criteria are met;

(vi) in the case that the predefined criteria are met, allowing execution of the software element;

(vii) in the case that the predefined criteria are not met, preventing execution of the software element.

One embodiment provides a method wherein the validation token is a function of a parameter of the image data maintained on the image area.

One embodiment provides a method wherein the validation token is a function of a parameter of an identifier maintained on the non-image area.

One embodiment provides a method wherein the validation token is a function of a parameter of the image data maintained on the image area and a parameter of an identifier maintained on the non-image area.

One embodiment provides a method wherein the validation token is a function of a parameter of the image data maintained on the image area and a parameter of an identifier unique to the carrier medium.

One embodiment provides a method wherein the data read at (ii) includes a hash of the data maintained on the image area.

One embodiment provides a method wherein the data read at (ii) includes a hash of the data defining the software element.

One embodiment provides a method wherein the non-image area of the carrier medium includes firmware for allowing operation of the carrier medium.

One embodiment provides a method wherein the method is performed via BIOS of the gaming machine.

One embodiment provides a method wherein the method is performed via software instructions maintained on a carrier medium accessible to the gaming machine.

One embodiment provides a method wherein the software element, upon execution, performs a validation check of the BIOS of the gaming machine and only allows further execution in the case that of a successful validation check.

One embodiment provides a data protection method including:

(i) identifying data indicative of a software element parameter of a software element to be protected;

(ii) identifying data indicative of a carrier medium parameter of a carrier medium that is authorized to carry the software element; and (iii) writing a validation token to a non-image area of the carrier medium, wherein the validation token is a function of the software element parameter and the carrier medium parameter.

One embodiment provides a gaming machine configured to perform a method as described herein.

One embodiment provides a computer system including a web server configured to deliver a web based interface to a plurality of user terminals, wherein the web server is configured to perform a method as described herein.

One embodiment provides a computer system including a microprocessor configured to perform a method as described herein.

One embodiment provides a tangible non-transient computer readable medium carrying executable code that when executed on one or more microprocessors of a computer system cause the computer system to perform a method as described herein.

One embodiment provides a computer program product configured for allowing the performance of a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF DRAWINGS

Preferred embodiments of the invention will now be described, by way of example only, with reference to the accompanying drawings in which.

DETAILED DESCRIPTION OF THE VARIOUS EMBODIMENTS

Described herein are systems and methods for data protection. In overview, the present systems and methods are primarily adapted to provide data protection in situations where a software image is regulated, thereby limiting the ability to embed a unique identifier in the software image or an image area of a carrier medium that carries the software image. In overview, according to one embodiment a data protection method includes identifying data indicative of a software element parameter of a software element to be protected. For instance, this may include or be based upon a hash of the software element image or carrier media image area. The method additionally includes identifying data indicative of a carrier medium parameter of a carrier medium that is authorized to carry the software element. For instance, this may be a unique identifier or the like embedded in a non-image area of the carrier medium. A validation token is then defined based on a predefined protocol, the validation token being a function of the software element parameter and the carrier medium parameter. This validation token is written to a non-image area of the carrier medium. A device configured to execute the software element uses the same predefined protocol to verify the validation token prior to allowing execution of the software element. If the software element is copied to another carrier medium, the validation token would not be verified for the copied software, thereby restricting execution of the copied software element.

Any reference herein to "casino-type" games should not be read to infer any requirement that a game be played in a casino as such. The descriptor is simply used to differentiate gaming in the context of gambling-related gaming (e.g. electronic gaming machines in the form of slot/poker machines, electronic roulette games, jackpot controllers and the like) from gaming in the sense of video games played for recreational (non-gambling) purposes.

Method Overview

Figure 1:
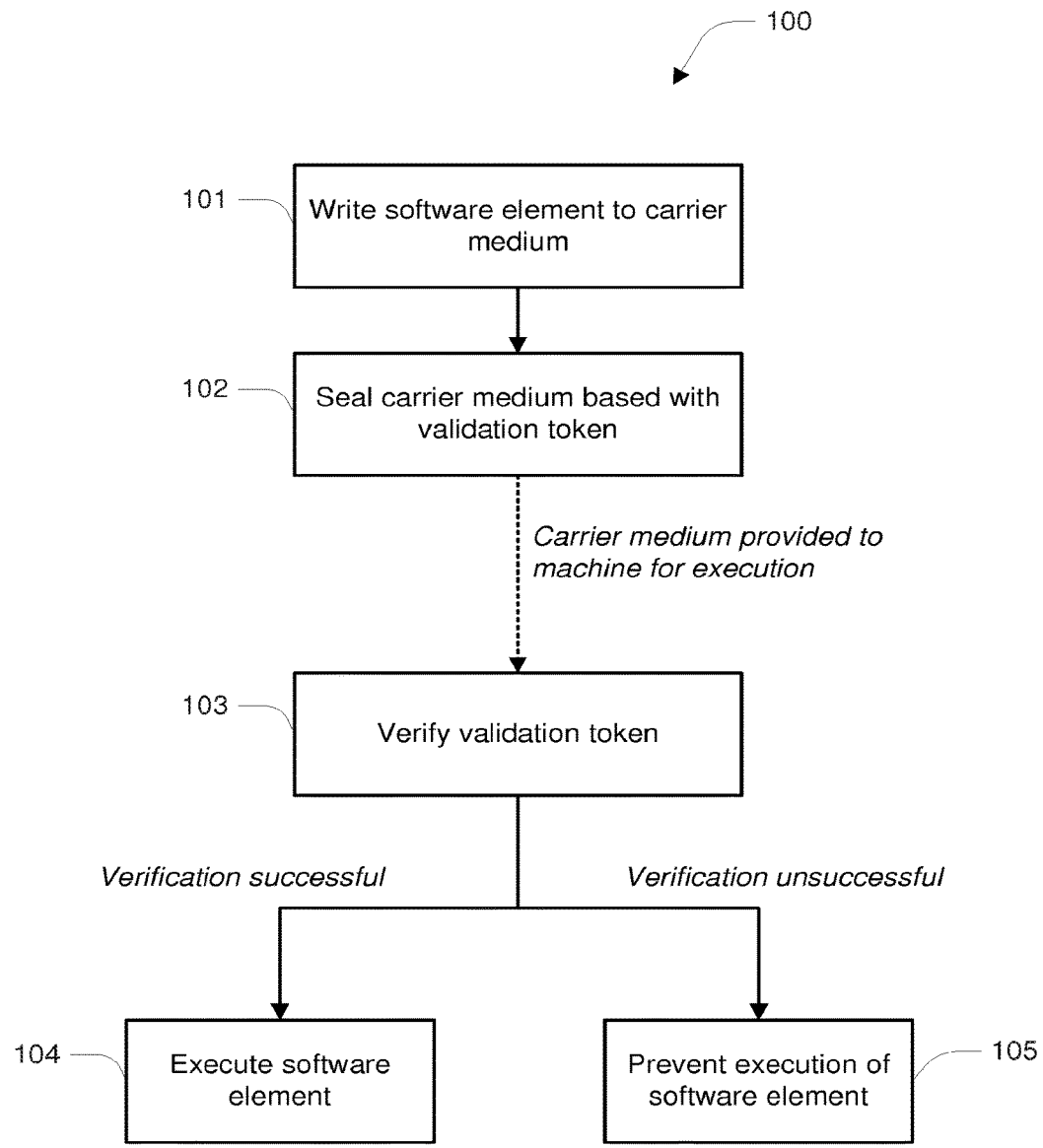
FIG. 1 schematically illustrates a method according to one embodiment.

FIG. 1 illustrates a method 100 according to one embodiment. This method provides a general overview of a data protection arrangement according to various embodiments of the present invention. As context, method 100 is primarily intended for implementation in situations where a software element and/or carrier media image must be identical between copies. For instance, in the case of games for casino-type gaming machines, it is common for a software element (for example a software element that provides an executable casino-type game) to require regulatory approval. This regulatory approval essentially requires that all copies of that software element are identical (which may be verified by a hash test or the like applied to the software element and/or image area of a carrier medium that carries the software element).

Phase 101 includes writing the software element to a carrier medium, which in the present examples is considered to be a flash memory card (such as a Compact Flash card, also referred to as a CF card). However, it will be appreciated that other embodiments make use of alternate carrier media, and the present disclosure should not be limited to any particular form of carrier medium. The writing may be achieved by substantially any conventional technique, and involves writing data to an image area of the carrier medium.

The term "software element" as used herein describes a collection of computer executable code defining some or all of a software application that is able to be executed by an appropriate microprocessor-enabled machine. It is not necessary that the software element include all code necessary for execution of the software application.

Phase 102 includes sealing the carrier medium based on a predetermined protocol (which may be selected from a plurality of available protocols). More detailed explanation is provided below in relation to sealing processes according to the present embodiments. In overview, the sealing process includes defining a validation token, this validation token being defined as a function of data on the image area, and non-image data describing the carrier medium. This validation token is then written to the carrier medium, preferably to a non-image area, as discussed further below. Phase 102 may be performed by the same machine as phase 101, or a different machine to that which performs phase 101.

Phase 103 includes a token verification process. This is performed by a machine configured to execute the software element. In overview, phase 103 includes verifying the validity of the validation token based on the same protocol used to define the validation token at phase 102. For instance, the machine performing phase 103 defines a validation token using the same protocol as used at phase 102, and compares that with the validation token carried by the carrier medium (being the token defined at phase 102). If they match, then the token is verified, and the software element becomes executable at phase 104. Otherwise, execution of the software element is prevented at phase 105.

Exemplary Software Sealing Method and Hardware

Figure 2:
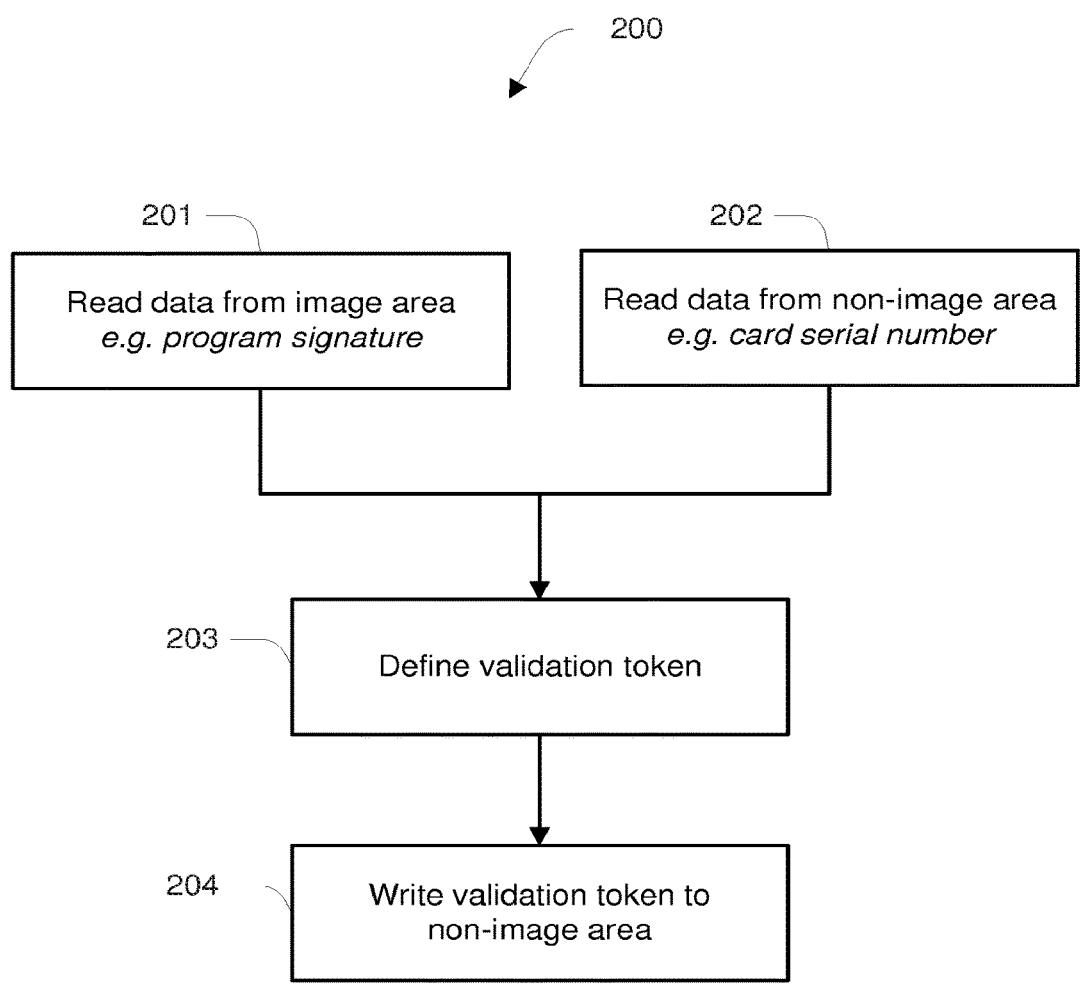
FIG. 2 illustrates a method according to one embodiment.
Figure 3:
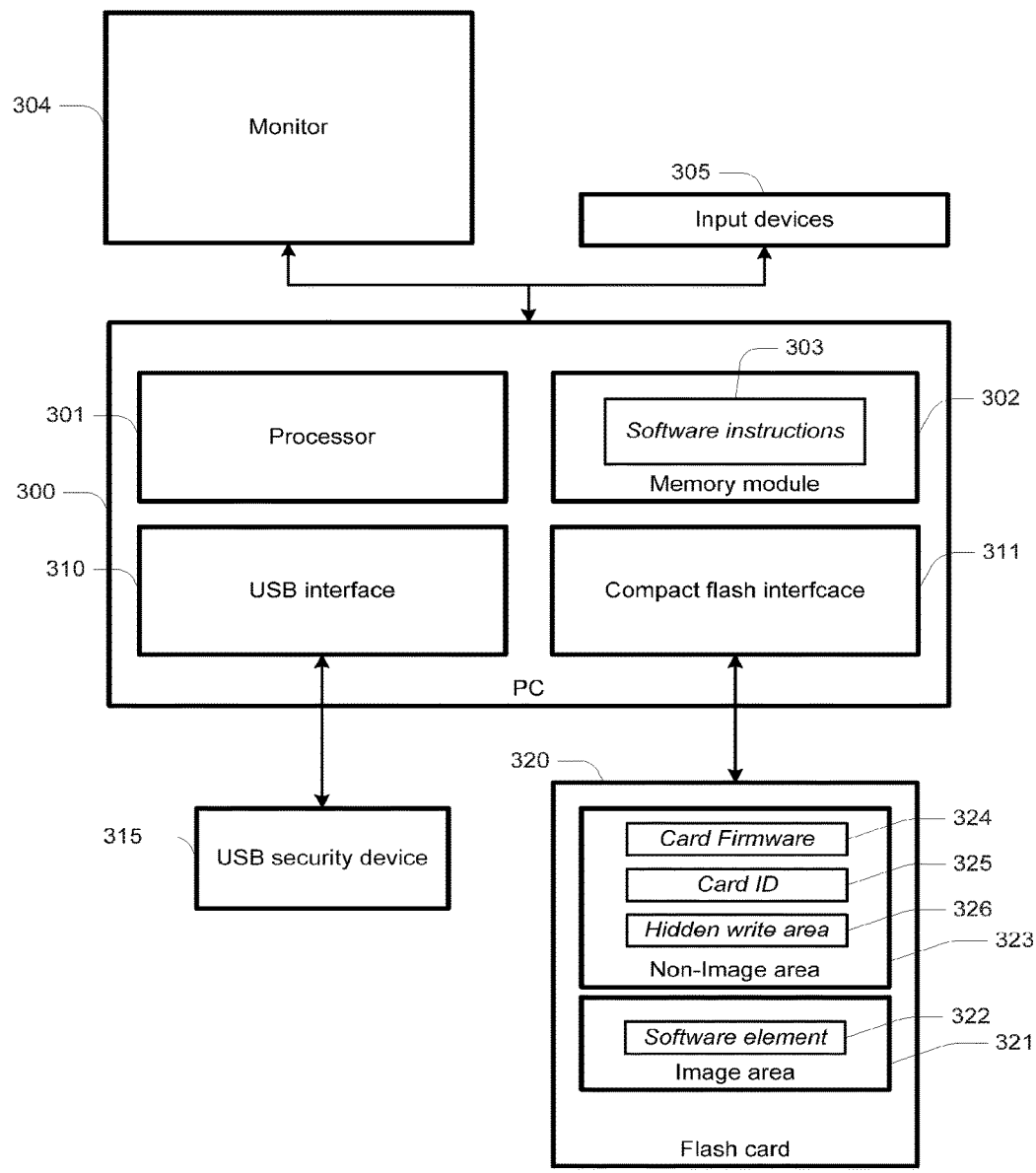
FIG. 3 illustrates a hardware arrangement according to one embodiment.

FIG. 2 illustrates a method 200 for applying copy protection to a software element maintained on a carrier medium. As presently described, method 200 is performed by way of a PC 300, shown in FIG. 3. However, it will be appreciated that method 200 may be performed via a range of hardware arrangements, including distributed arrangements.

So as to provide some initial context, PC 300 includes a microprocessor 301 coupled to a memory module 302. Memory module 302 includes software instructions 303, which enable PC 300 to perform method 200. In some embodiments some or all of software instructions 303 are hosted at a remote location or on an external device. A monitor 304 and user input devices 305 (such as mouse/keyboard devices) are coupled to PC 300 thereby to allow interaction with a user. PC 300 additionally includes a first interface 310, presently being a USB interface, and a second interface 311, presently being a flash card read/write interface (optionally provided by way of a PCMCIA card, PC card or the like).

Interface 310 is presently coupled to a USB security device 315. In overview, device 316 provides security data requires to enable performance of method 200. The precise manner by which this is implemented varies between embodiments, including the likes of remote key verification, time-limited keys, and the like. The general rationale is to provide additional security and control in relation to the performance of method 200.

Interface 311 is configured for interacting with a portable carrier medium, presently in the form of a Compact Flash card 320. As noted, this is exemplary only, and other embodiments make use of alternate carrier media. Card 320 includes an image area 321, being a portion of card 320 to which data is able to be written. Duplicating the image area in essence results in duplication of the card. Image area 321 carries a software element 322. Card 320 additionally includes a non-image area 323, which includes card firmware data 324, card identification data 325, and a hidden writable portion 326. Firmware data is stored in area 324 in such a manner as to prevent modification or replacement of the firmware (for instance by setting the relevant data area as one-time-write-only, and/or blocking firmware commands otherwise used to access that area).

In some embodiments firmware data 324 provides security functionalities to prevent unauthorized access to writable portion 326. This portion remains hidden from general users, and is accessible only using proprietary commands (which PC 300 is presently configured to provide, as discussed below).

Prior to the commencement of method 200, the software element to be protected is written to card 320. It will be appreciated that card 320 is not a standard flash card, due to the presence of hidden writable portion 326 in non-image area 323. During this process, when a flash card image is created, the image (including code defining the software element) is hashed using an algorithm such as the SHA-1 algorithm. This hash is then encrypted using a private key and the resultant data is appended at the end of the image as a program signature. The remaining area of the flash card is programmed with "0". Accordingly, a simplified view of the flash card is as follows:

| Software Element Image | Program Signature |
|---|---|

The program signature is optionally used to verify integrity of the software element. For example, a machine recalculates the program signature using the SHA-1 algorithm, compares results, and only allows execution of the software element where the signatures match.

Turning to the sealing process of method 200, step 201 includes reading data maintained on image area 321 of the carrier medium. In the present embodiment, this includes reading the program signature, being a parameter of the software element. In other embodiments this includes reading the image data and defining a program signature via a hash or the like.

Step 202 includes reading non-image data area 323 of carrier medium 320, including a unique identifier for the carrier medium. Specifically, step 202 includes reading a unique card identifier (such as a serial number or the like) from area 325.

Step 203 includes applying a predetermined algorithm to data read at 201 and 202 thereby to define a validation token for the software element as carried by the carrier medium. In the present embodiment, the algorithm combines the program signature with the card identifier thereby to define a validation token that is unique to the card, using a private key.

Step 204 includes writing the validation token to hidden area 326 of the non-image area 323 of card 320. In the present embodiment area 326 is 256 bytes in size, such that malicious code cannot be stored alongside the validation token. Writing to area 326 is achieved by way of proprietary commands defined specifically to interact with non-standard aspects of the firmware of card 320. It will be appreciated by those familiar with the design and manufacture of such carrier media how firmware can be defined and/or modified to work with such proprietary commands.

Exemplary Software Verification Method

Figure 4:
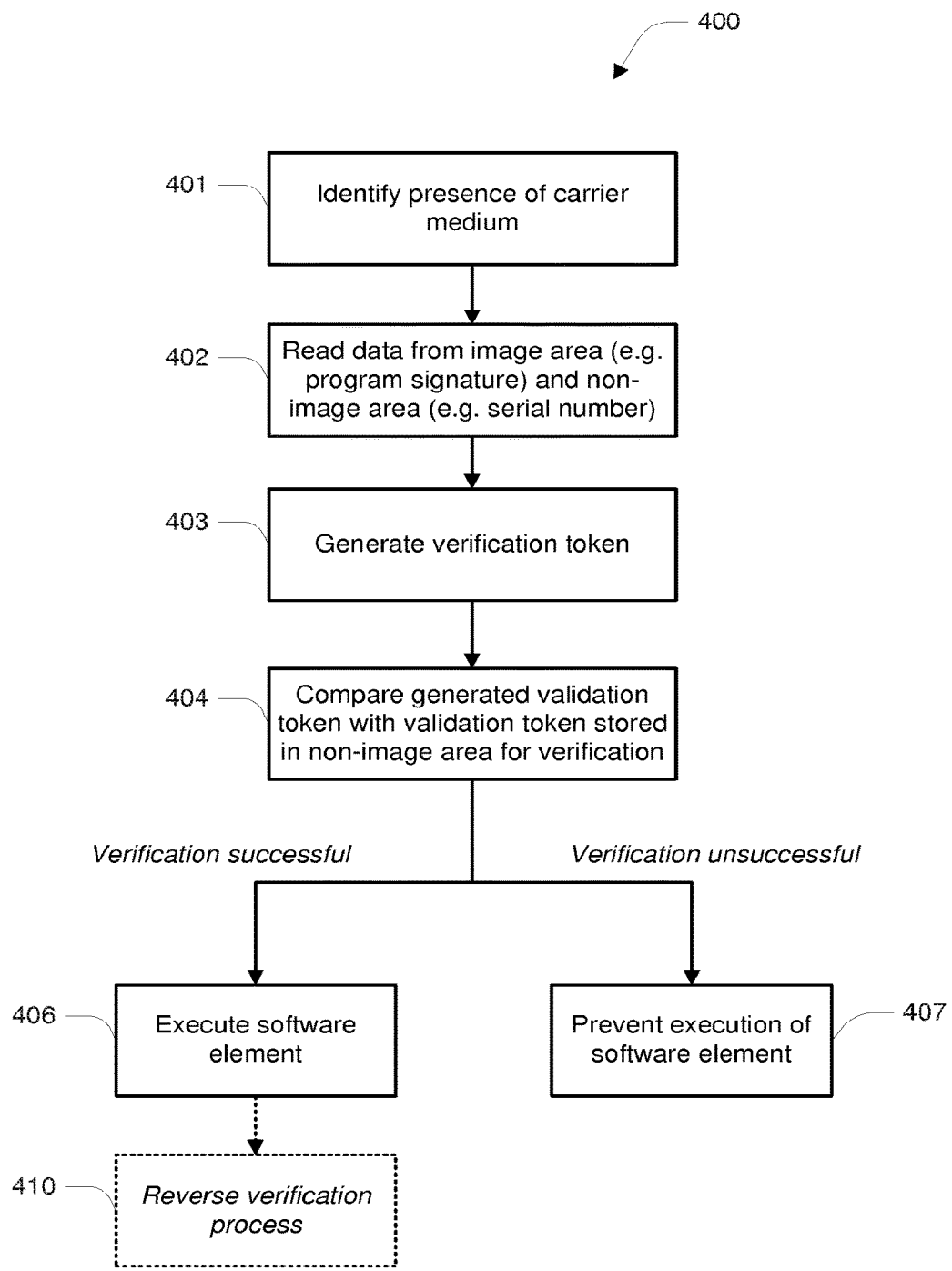
FIG. 4 illustrates a method according to one embodiment.

FIG. 4 illustrates an exemplary method 400 for executing the software element carried by card 320. This method is performed by any machine configured to execute the software element. For example, functionality underlying the ability to execute the software element may be built into the operating system or BIOS of the machine performing method 400.

Step 401 includes receiving data indicative of the introduction of a carrier medium, in this example being card 320. For instance, card 320 may be inserted into a CF card slot prior to the machine being booted, and the card is recognized during the boot-up process. The machine interacts with the CF card firmware substantially in the conventional manner, and the machine determines that it should seek to verify the software element.

Step 402 includes reading data maintained on the image area of the carrier medium, and data from the non-image data area of the carrier medium. In essence, step 402 is a replication of steps 201 and 202 described above, resulting in reading of the program signature and a unique identifier of the card. These are then processed at 403 via the same general process used at step 203. That is, the same predetermined algorithm is used to define a validation token for the software element as carried by the carrier medium.

The validation token defined at step 203 is compared, at step 404, with the validation defined at token carried in area 326 of card 320 to determine whether predefined criteria are met. Typically, the criteria require that the validation token defined at 403 matches that located on the card. In the case that the predefined criteria are met, the process continues by allowing execution of the software element at 406. On the other hand, in the case that the predefined criteria are not met, execution of the software element is prevented at 407.

In some embodiments, following step 406 method 400 progresses to a reverse verification process at 410. This process is used to verify that the component responsible for performing the token verification has predefined characteristics, and only allow continued execution in the case where that verification is successful. The rationale is to prevent unauthorized execution of the software element from being achieved via modification of an element responsible for performing method 400. In some embodiments method 400 is performed by BIOS, and 410 is essentially a BIOS check to ensure that predefined BIOS is present.

Application to Electronic Gaming Machine

Figure 5:
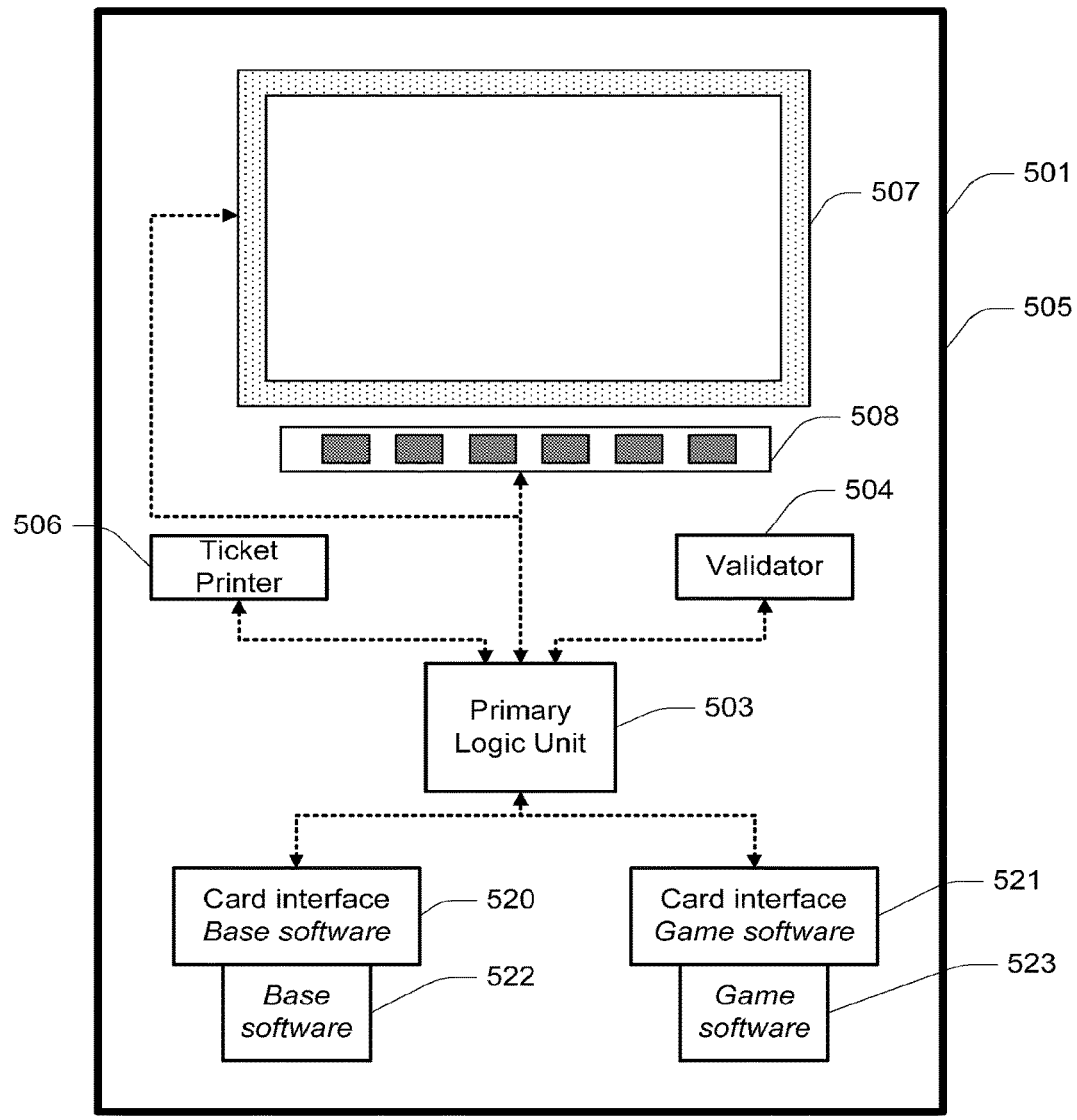
FIG. 5 illustrates a gaming machine according to one embodiment.

FIG. 5 illustrates an electronic gaming machine (EGM) 501 according to one embodiment. Specifically, EGM 501 is illustrated as a casino-type EGM for providing a video poker game, commonly referred to as a "slot machine" or "poker machine". The example of this form of EGM should not be regarded as necessarily limiting, and other embodiments relate to alternate forms of EGM. It will be appreciated that FIG. 1 is not to scale, and is intended to provide a schematic overview of EGM components.

EGM 501 includes a central logic unit 503. Logic unit 503 includes processing means coupled to a memory unit for executing instructions embedded in software, thereby to provide a gaming functionality. Logic unit 503 further includes various inputs and outputs for connection to other components within the EGM, such bill validators, card readers, monitors, and the like.

Validator 504 is configured for receiving credit, such as via currency tokens in the form of bank notes, and providing validator signals to logic unit 503 indicative of validator activity. Logic unit 503 and validator 504 are maintained within a casing 505. EGM 501 also includes within casing 505 a ticket printer 506 which, in conventional use, is responsive to instructions from logic unit 503 for printing tickets related to gaming activity. In this regard, EGM 501 also includes a display 507 coupled to logic unit 503 for providing a visual representation of gaming activity, and a user interface 508 for facilitating user interaction for the purpose of gaming.

In the present embodiment, logic unit 503 is configured to read data from carrier media. Specifically, logic unit is coupled to a two card readers 520 and 521. In the present embodiments these card readers are configured to receive and interact with respective carrier media such as Compact Flash cards. However, it will be appreciated that the present disclosure is not limited to any particular form of carrier media. Card reader 520 is configured for receiving a base software card 522, which maintains a base software application defined by code executable by logic unit 503 thereby to provide general functionalities to EGM 503. Card reader 520 is configured for receiving a game software card 523, which maintains a game software application defined by code executable by logic unit 503 thereby to allow EGM 503 to provide a specific game for play by a user (in this example being a video poker or slot machine game).

In overview, EGM 501 starts up based on BIOS, and begins a procedure for loading software instructions carried by card 522. If that procedure is successful, EGM 501 is able to begin a further procedure for verifying the game software carried by card 523. The BIOS verifies the both base card 522 and game card 523 prior to loading or executing any software maintained on those cards. If the verification is successful, EGM 101 is rendered functional to allow a user to play a game defined by the game software.

In other embodiments the base software application is maintained on a memory module of logic unit 103 as opposed to being maintained on portable media such as card 522.

According to the present embodiment, software elements maintained on cards 522 and 523 (i.e. the base software and game software) are subjected to a copy protection protocol as described further above. This operates to ensure that the software is only executable in the event that the cards have appropriate validation tokens, thereby to restrict the ability of EGM 501 to execute unauthorized copies of the software elements. In particular, on startup the BIOS of logic element 503 reads cards 522 and 523 to verify the validation tokens, using a method such as method 400. In this example, step 410 is used to verify the BIOS of logic element 503. In the case of successful validation token verification and BIOS verification, EGM 501 loads the software element of cards 522 and 523, which provides a general operating framework for the machine (via card 522) and a game for execution on the machine (via card 523).

In an alternate embodiment, rather than verifying the tokens of both cards 522 and 523 via BIOS at startup, the machine first verifies and loads software on card 522, and then proceeds to attempt loading a game maintained on card 523, resulting in another iteration of method 400, thereby to verify the validation token of card 523.

CONCLUSIONS

It will be appreciated that the disclosure above provides various novel and inventive systems and methods for data protection. In particular, the present approaches provide significant benefits in circumstances where software integrity is strictly regulated, such as the gaming industry.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

The invention claimed is:

1. An electronic gaming machine comprising:
   at least one reader configured to receive a carrier medium, the carrier medium including an image area, being a primary storage location that is able to be copied to a second carrier medium and including a software element that is defined by a collection of computer executable code defining some or all of a software application that is able to be executed by a logic unit, and a non-image area, being a hidden storage location that is not able to be copied to a second carrier medium, is configured to be accessed only using proprietary commands and including a unique identifier for the carrier medium; and a logic unit coupled to the at least one reader, the logic unit configured to (i) read data from the image area of the carrier medium, (ii) read data from the non-image area of the carrier medium, (iii) apply a predetermined algorithm to the data read at (i) and (ii) to define a validation token for the software element as carried by the carrier medium, (iv) compare the validation token defined at (iii) to an existing validation token carried on the non-image area of the carrier medium to determine whether predefined criteria are met, (v) in the case that the predefined criteria are met, allowing execution of the software element, and (vi) in the case that the predefined criteria are not met, preventing execution of the software element.

2. The electronic gaming machine according to claim 1, wherein the validation token is a function of a parameter of the image data maintained on the image area.

3. The electronic gaming machine according to claim 1, wherein the validation token is a function of a parameter of an identifier maintained on the non-image area.

4. The electronic gaming machine according to claim 1, wherein the validation token is a function of a parameter of the image data maintained on the image area and a parameter of an identifier maintained on the non-image area.

5. The electronic gaming machine according to claim 1, wherein the validation token is a function of a parameter of the image data maintained on the image area and a parameter of an identifier unique to the carrier medium.

6. The electronic gaming machine according to claim 1, wherein the data read at (i) includes a hash of the data maintained on the image area.

7. The electronic gaming machine according to claim 1, wherein the data read at (i) includes a hash of the data defining the software element.

8. The electronic gaming machine according to claim 1, wherein the non-image area of the carrier medium includes firmware for allowing operation of the carrier medium.

9. The electronic gaming machine according to claim 1, the logic unit executes a BIOS that (i) reads the data from the image area of the carrier medium; (ii) reads the data from the non-image area of the carrier medium; (iii) applies a predetermined algorithm to the data read at (i) and (ii) to define a validation token for the software element as carried by the carrier medium; (iv) compares the validation token defined at (iii) to an existing validation token carried on the non-image area of the carrier medium to determine whether predefined criteria are met; (v) in the case that the predefined criteria are met, allows execution of the software element; and (vi) in the case that the predefined criteria are not met, prevents execution of the software element.

10. The electronic gaming machine according to claim 9, wherein the software element, upon execution, performs a validation check of the BIOS of the electronic gaming machine and only allows further execution in the case of a successful validation check.

11. The electronic gaming machine according to claim 1, wherein the software element is defined by code executable by the logic unit to provide a specific game for play by a user.

12. The electronic gaming machine according to claim 11, wherein the game is video poker or slots.

13. The electronic gaming machine according to claim 1, wherein the software element is defined by code executable by the logic unit to provide general functionalities to the electronic gaming machine.

14. The electronic gaming machine according to claim 1, further comprising a first reader and a second reader, the first reader configured to receive a carrier media that maintains a base software application executable by the logic unit to provide general functionalities of the electronic gaming machine and the second reader configured to receive a carrier medium that maintains a game software application executable by the logic unit to provide a specific game for play by a user.

15. The electronic gaming machine according to claim 14, the logic unit
   (i) reads the data from the image area of a carrier medium associated with the first reader, (ii) reads the data from the non-image area of the carrier medium associated with the first reader, (iii) applies a predetermined algorithm to the data read at (i) and (ii) to define a validation token for the software element as carried by the carrier medium associated with the first reader, and (iv) compares the validation token defined at (iii) to an existing validation token carried on the non-image area of the carrier medium associated with the first reader to determine whether predefined criteria are met;
   (i) reads the data from the image area of a carrier medium associated with the second reader, (ii) reads the data from the non-image area of the carrier medium associated with the second reader, (iii) applies a predetermined algorithm to the data read at (i) and (ii) to define a validation token for the software element as carried by the carrier medium associated with the second reader, and (iv) compares the validation token defined at (iii) to an existing validation token carried on the non-image area of the carrier medium associated with the second reader to determine whether predefined criteria are met; and
   in the case that the predefined criteria are met for the carrier medium associated with the first reader and the carrier medium associated with the second reader, loads the software element associated with the first and second carrier media; and (vi) in the case that the predefined criteria are not met for either reader, does not load the software element associated with the first or second carrier media.

16. The electronic gaming machine according to claim 14, the logic unit
   (i) reads the data from the image area of a carrier medium associated with the first reader, (ii) reads the data from the non-image area of the carrier medium associated with the first reader, (iii) applies a predetermined algorithm to the data read at (i) and (ii) to define a validation token for the software element as carried by the carrier medium associated with the first reader, (iv) compares the validation token defined at (iii) to an existing validation token carried on the non-image area of the carrier medium associated with the first reader to determine whether predefined criteria are met, (v) in the case that the predefined criteria are met, loads the software element, and (vi) in the case that the predefined criteria are not met, does not load the software element; and
   subsequently, (i) reads the data from the image area of a carrier medium associated with the second reader, (ii) reads the data from the non-image area of the carrier medium associated with the second reader, (iii) applies a predetermined algorithm to the data read at (i) and (ii) to define a validation token for the software element as carried by the carrier medium associated with the second reader, (iv) compares the validation token defined at (iii) to an existing validation token carried on the non-image area of the carrier medium associated with the second reader to determine whether predefined criteria are met, (v) in the case that the predefined criteria are met, loads the software element, and (vi) in the case that the predefined criteria are not met, does not load the software element.

17. The electronic gaming machine according to claim 1, wherein at least one reader comprises a flash memory card reader.

18. The electronic gaming machine according to claim 1, wherein the logic unit comprises at least one processor coupled to a memory unit.

19. The electronic gaming machine according to claim 1, wherein the logic unit is configured according to software instructions maintained on a carrier medium accessible to the gaming machine.

20. The electronic gaming machine according to claim 1, wherein the machine further comprises a validator configured to receive credit and provide a signal to the logic unit based on credit received via the validator.

* * * * *